United States Patent [19]
Pfahlert et al.

[11] Patent Number: 6,002,921
[45] Date of Patent: Dec. 14, 1999

[54] LOCKABLE RADIOTELEPHONE CRADLE

[75] Inventors: Diane Elaine Pfahlert, Wake Forest; John Charles Phillips, Raleigh, both of N.C.

[73] Assignee: Ericsson Inc., Research Triangle Park, N.C.

[21] Appl. No.: 08/972,090

[22] Filed: Nov. 17, 1997

[51] Int. Cl.$^6$ .................................................. H04B 1/38
[52] U.S. Cl. ......................... 455/90; 455/550; 455/575; 455/420
[58] Field of Search ............................ 455/550, 90, 575, 455/419, 420; 379/445, 446, 454–5, 426; 320/115 D, 107; 340/425.5–490; 224/929, 567–571; 248/689, 551, 593–595

[56] References Cited

U.S. PATENT DOCUMENTS

| | | | |
|---|---|---|---|
| 4,056,696 | 11/1977 | Meyerle et al. | 379/419 |
| 5,157,375 | 10/1992 | Drori | 340/429 |
| 5,349,637 | 9/1994 | Miller | 379/445 |
| 5,463,688 | 10/1995 | Wijas | 379/446 |
| 5,479,486 | 12/1995 | Saji | 455/573 |
| 5,610,979 | 3/1997 | Yu | 379/455 |
| 5,640,301 | 6/1997 | Roecker et al. | 361/686 |
| 5,659,887 | 8/1997 | Ooe | 455/575 |
| 5,726,893 | 3/1998 | Schuchman et al. | 455/456 |
| 5,825,874 | 10/1998 | Humphreys et al. | 379/446 |
| 5,828,966 | 10/1998 | Davis et al. | 455/573 |
| 5,832,082 | 11/1998 | Nagai | 379/449 |
| 5,892,441 | 4/1999 | Woolley et al. | 340/539 |
| 5,898,775 | 4/1999 | Niemo et al. | 379/446 |
| 5,903,645 | 5/1999 | Tsay | 379/455 |
| 5,903,850 | 5/1999 | Huttunen et al. | 455/557 |

*Primary Examiner*—Dwayne D. Bost
*Assistant Examiner*—Charles R Craver
*Attorney, Agent, or Firm*—Myers Bigel Sibley & Sajovec, P.A.

[57] ABSTRACT

A lockable cradle removably supports a device, such as a radiotelephone. The cradle is configured to be locked and unlocked only upon receipt of authorized locking and unlocking signals. A signal receiver is associated with the cradle for receiving locking signals to lock the cradle to prevent removal of the device from the cradle, and for receiving unlocking signals to unlock the cradle to allow removal of the device from the cradle. A signal generator in communication with the signal receiver generates locking and unlocking signals. The signal generator may generate signals responsive to user input or responsive to input from systems external to the device, such as vehicle security and ignition systems.

29 Claims, 2 Drawing Sheets

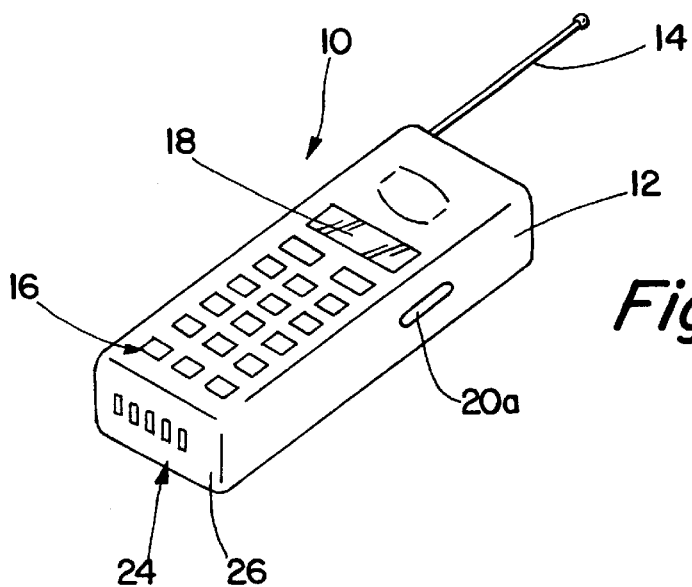
Fig. 1
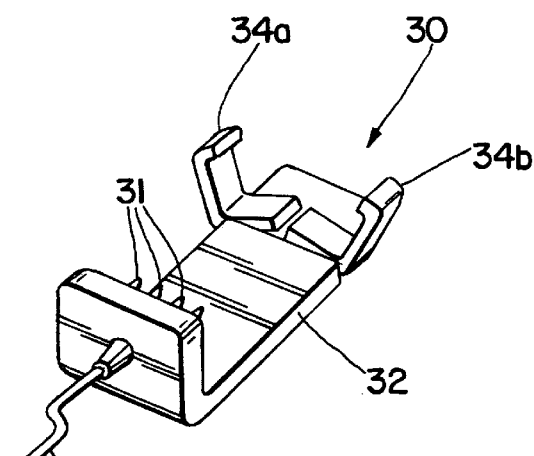
Fig. 2
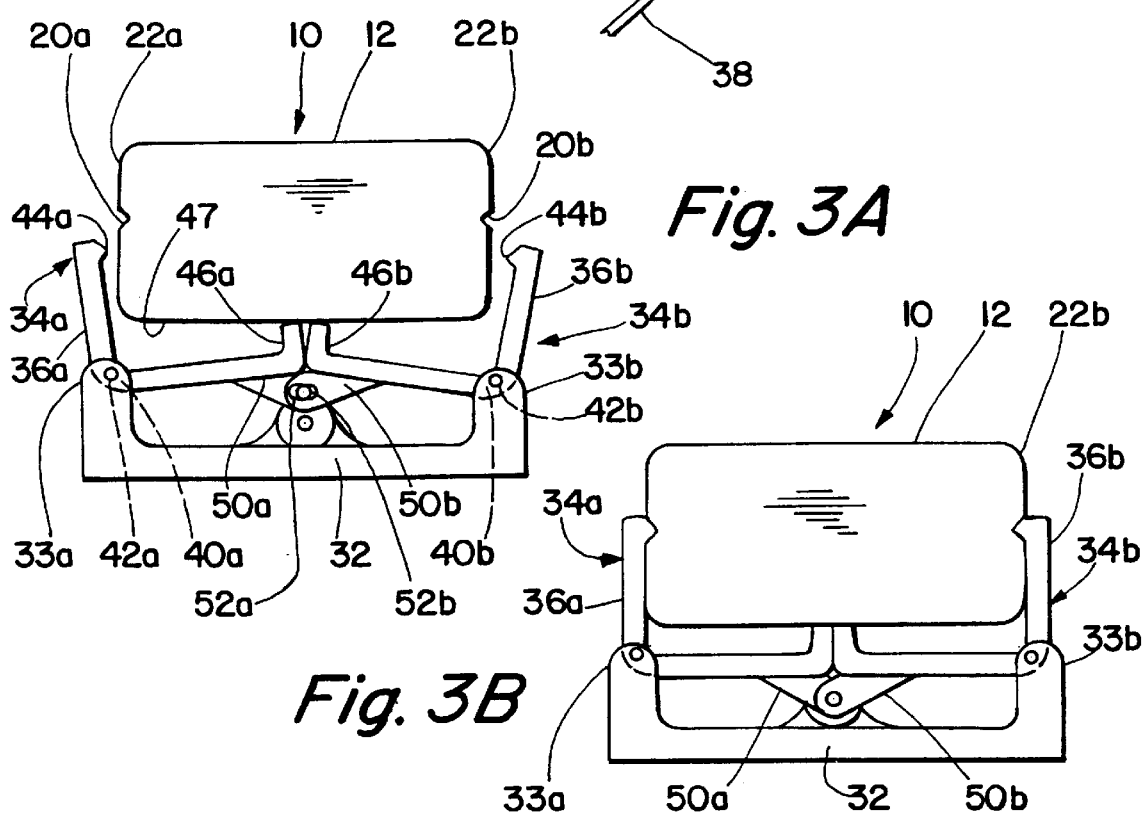
Fig. 3A
Fig. 3B

LOCKABLE RADIOTELEPHONE CRADLE

FIELD OF THE INVENTION

The present invention relates generally to security systems and devices for electronic devices, and more particularly to security systems and devices for radiotelephones.

BACKGROUND OF THE INVENTION

Radiotelephones, such as "cellular" telephones, have become increasingly popular for both personal and commercial use. Radiotelephones have also become smaller to facilitate storage and portability. The use of radiotelephones within vehicles has also become increasingly popular. For vehicular use, a radiotelephone is often mounted within a cradle which facilitates "hands-free" operation.

Unfortunately, theft of radiotelephones has become an increasing problem in many parts of the world. In particular, radiotelephones mounted within vehicle cradles are often easy targets for thieves. One method of deterring theft of electronics devices mounted within vehicles, such as radios and tape players, includes allowing the faceplate of the electronics device to be removed, thereby rendering the device unattractive to a thief. Another method utilizes key locks for making removal of a device difficult without a key. Unfortunately, removable portions and key locks are generally undesirable for radiotelephones because of the small size of radiotelephones.

SUMMARY OF THE INVENTION

It is therefore an object of the present invention to provide systems and devices that can deter theft of electronic devices such as radiotelephones.

It is another object of the present invention to provide systems and devices that can deter theft of radiotelephones mounted within vehicle cradles.

These and other objects of the present invention are provided by a lockable cradle for removably supporting a device therewithin. The present invention is particularly suitable for removably supporting electronics devices, such as radiotelephones. When secured within a lockable cradle according to the present invention, a radiotelephone can be removed only upon receipt of an authorized locking signal or signals.

A signal receiver is associated with the cradle and serves as means for receiving locking signals to lock the cradle arms to prevent removal of the radiotelephone from the cradle and as means for receiving an unlocking signal to unlock the cradle arms to allow removal of the radiotelephone from the cradle. A signal generator may be provided that is in communication with the signal receiver and which serves as means for generating locking and unlocking signals. The signal generator may generate locking and unlocking signals in various ways, such as via the radiotelephone or via vehicle security and/or ignition systems.

According to an aspect of the present invention, a pair of opposing arms are configured to move in unison between a first position for receiving a radiotelephone within a cradle and a second position for securing the radiotelephone within the cradle. The pair of arms serve as means for removably securing a radiotelephone within the cradle. A locking mechanism prevents the radiotelephone secured within the cradle from being removed therefrom by restricting movement of the pair of arms. This locking mechanism is activated to lock, and correspondingly unlock, the cradle when proper locking and unlocking signals are received.

Each arm of the pair of arms has a member extending therefrom with an aperture formed therein. The members are configured such that the respective apertures align coaxially when the pair of arms are in the second position. Each arm of the pair of arms has a portion configured to engage a portion of the radiotelephone housing when the pair of arms are in the second position thereby securing the radiotelephone within the cradle.

A locking device includes a pin configured to be removably inserted through the coaxially aligned apertures when the pair of arms are in the second position (i.e., when a radiotelephone is secured by the pair of arms). An actuator is provided for removably inserting the pin through the coaxially aligned apertures in response to the signal receiver receiving a locking signal, and for removing the pin from the coaxially aligned apertures in response to the signal receiver receiving an unlocking signal.

According to another aspect of the present invention, a radiotelephone secured within a cradle may be rendered inoperable if the radiotelephone is removed from the cradle without the signal receiver receiving a proper unlocking signal. An alarm may be generated if the radiotelephone is removed from the cradle without the signal receiver receiving a proper unlocking signal.

Because of its theft-deterrent capability, the present invention is particularly useful for radiotelephones mounted within vehicles. A cradle incorporating aspects of the present invention can be locked without requiring a key or other mechanical device. A radiotelephone can be removed when a particular code sequence is provided via the radiotelephone keypad or when other unlocking signals are received. Accordingly, unauthorized removal of a radiotelephone from its cradle can be made difficult by the present invention. Furthermore, the present invention facilitates rendering a radiotelephone inoperative if unauthorized removal occurs. The theft-deterrent ability of the present invention may also be increased because of the compatibility of the present invention with vehicle security and ignition systems.

BRIEF DESCRIPTION OF THE DRAWINGS

FIG. 1 illustrates a radiotelephone having retaining slots for securing the radiotelephone within a cradle.

FIG. 2 illustrates a cradle for retaining a radiotelephone.

FIGS. 3A–3B illustrate a security locking mechanism for the cradle of FIG. 2, according to an aspect of the present invention.

DETAILED DESCRIPTION OF THE INVENTION

Figure 4:
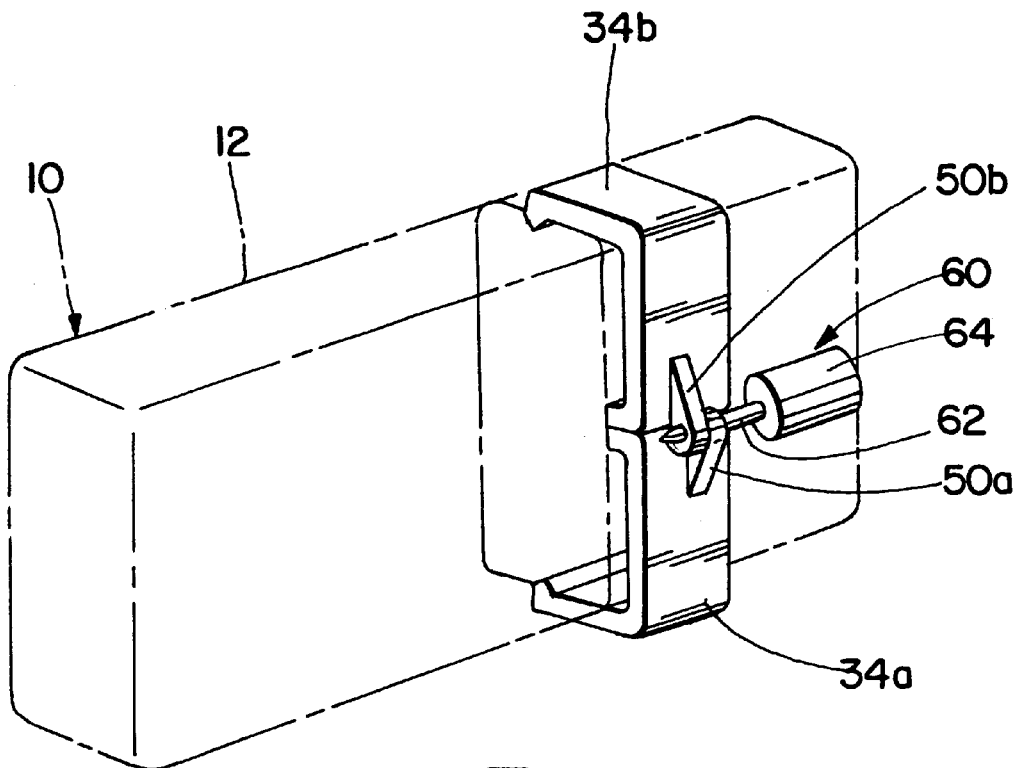
FIG. 4 illustrates a radiotelephone secured within the cradle of FIG. 2 with the security locking mechanism of FIGS. 3A–3B engaged.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a conventional radiotelephone 10 includes a housing 12 for enclosing electronic components that enable the radiotelephone 10 to transmit and receive telecommunications signals. An antenna 14 for receiving telecommunications signals, a keypad 16, and a display window 18 facilitate radiotelephone operation. A pair of slots 20a and 20b on respective side portions 22a and 22b of the radiotelephone housing 12 facilitate securing the radiotelephone 10 within a cradle 30 (described in detail below). Electrical connectors 24 on a bottom portion 26 of the illustrated radiotelephone housing 12 are configured to connect with electrical connectors in the cradle to facilitate hands-free operation of the radiotelephone when mounted within the cradle.

Referring now to FIG. 2, a cradle 30 for holding the radiotelephone illustrated in FIG. 1 in position for hands-free use is illustrated. The illustrated cradle 30 is a type often used for supporting radiotelephones for use within vehicles. The illustrated cradle 30 includes a frame 32 having a pair of pivot arms 34a and 34b pivotally mounted thereto for removably securing a radiotelephone to the frame. Electrical connectors 31 mounted to a bottom portion of the illustrated frame 32 are configured to engage the electrical connectors 24 on a bottom portion 26 of the illustrated radiotelephone housing 12 (FIG. 1). As is known to those skilled in the art, electrical power may be provided to a radiotelephone mounted within the cradle 30 via electrical connectors 31 and wiring 38. An external speaker may also be connected to the radiotelephone via electrical connectors 31 and wiring 38.

Referring now to FIGS. 3A and 3B, operations of the pivot arms 34a and 34b for removably securing a radiotelephone 10 within the cradle 30 are illustrated. In the illustrated embodiment, each pivot arm 34a, 34b has a generally L-shaped configuration. Pivot arm 34a includes an upper portion 36a and a lower portion 38a. Pivot arm 34a is pivotally connected, via a pin 42a, to a portion 33a of the frame 32 at the corner 40a of the "L" (i.e., where the upper portion 36a and lower portion 38a intersect), as illustrated. The upper portion 36a of pivot arm 34a includes a rib 44a configured to engage a respective slot 20a on a side portion 22a of the radiotelephone housing 12.

Similarly, pivot arm 34b includes an upper portion 36b and a lower portion 38b. Pivot arm 34b is pivotally connected, via a pin 42b, to a portion 33b of the frame 32 at the corner 40b of the "L" (i.e., where the upper portion 36b and lower portion 38b intersect), as illustrated. The upper portion 36b of pivot arm 34b includes a rib 44b configured to engage a respective slot 20b on a side portion 22b of the radiotelephone housing 12.

In the illustrated embodiment, the lower portion 38a of pivot arm 34a has a foot portion 46a configured to engage the back portion 47 of the radiotelephone housing 12. When the radiotelephone 10 is placed within the cradle 30 and pressure is applied to the foot portion 46a, the arm 34a pivots in a clockwise direction, as viewed from FIG. 3A, and rib 44a on the upper portion 36a engages the slot 20a in the radiotelephone housing side portion 22a. Similarly, the lower portion 38b of pivot arm 34b has a foot portion 46b configured to engage the back portion 47 of the radiotelephone housing 12. When the radiotelephone 10 is placed within the cradle and pressure is applied to the foot portion 46b, the pivot arm 34b pivots in a counter-clockwise direction, as viewed from FIG. 3A, and rib 44b on the upper portion 36b engages the slot 20b in the radiotelephone housing side portion 22b. Preferably, the respective pivoting motion of pivot arms 34a, 34b occurs at the same time (i.e., in unison) when a radiotelephone 10 is placed within the cradle 30, as illustrated, and pressure is applied to the respective foot portions 46a, 46b.

As illustrated in FIG. 3B, when a radiotelephone 10 is properly seated within the illustrated cradle 30, ribs 44a and 44b on the upper portions 36a and 36b engage slots 20a and 20b, respectively. In the illustrated embodiment, the lower portion 38a, 38b of arms 34a, 34b are slightly longer than half the distance between the pivot points (i.e., where pins 42a, 42b pivotally connect arms 34a, 34b to a respective portion 33a, 33b of the frame 32). Accordingly, when a force is exerted downwardly on the foot portions 46a, 46b of respective arms 34a, 34b, the arms "interfere" with each other until sufficient force is applied to cause the arms to "snap over-center" like a toggle switch. When arms 34a, 34b snap over-center, the upper portions 36a, 36b move towards each other allowing the ribs 44a, 44b to engage respective slots 20a and 20b.

Preferably, ribs 44a, 44b and respective slots 20a, 20b have configurations that allow the radiotelephone 10 to be removed from the grasp of the pivot arms 34a, 34b by pulling the radiotelephone away from the pivot arms. It should also be understood that the present invention is not limited to the illustrated cradle and pivot arm configuration. A radiotelephone may be removably secured within a cradle in various other ways without departing from the spirit and intent of the present invention.

Figure 5:
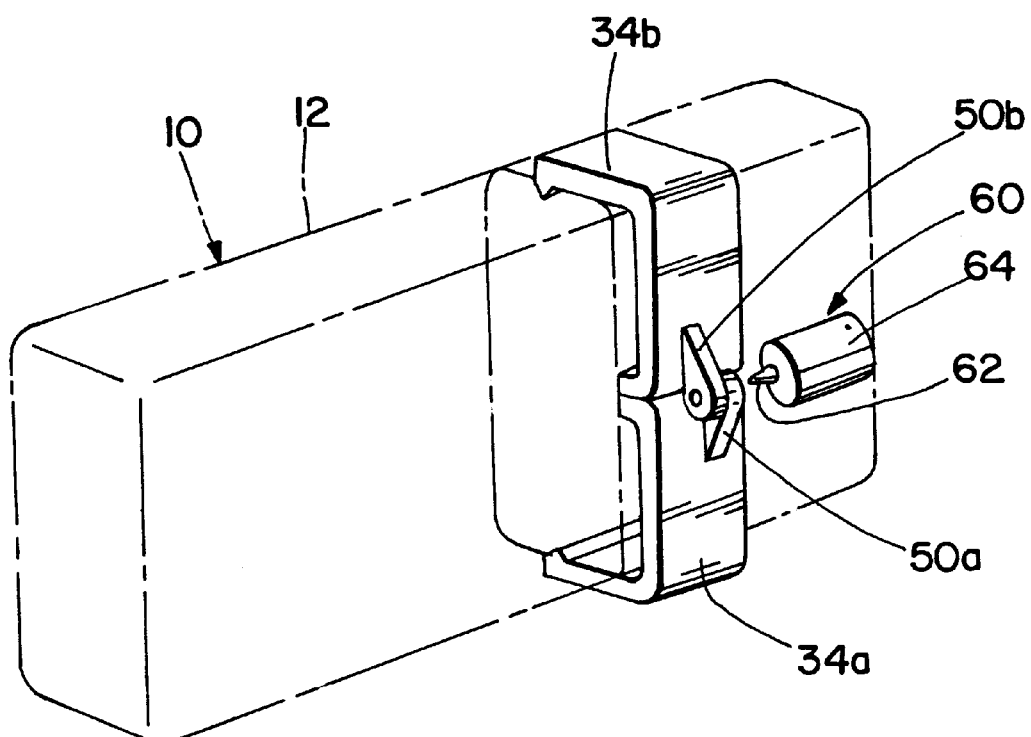
FIG. 5 illustrates a radiotelephone secured within the cradle of FIG. 2 with the security locking mechanism of FIGS. 3A–3B disengaged.

Referring now to FIGS. 4 and 5, a locking device 60 for locking the pivot arms 34a, 34b to prevent a radiotelephone 10 from being removed therefrom will now be described. Each pivot arm 34a, 34b has a member 50a, 50b extending therefrom with a respective aperture 52a, 52b formed therein, as illustrated. The pivot arm members 50a, 50b are configured such that the respective apertures 52a, 52b are not coaxially aligned when the pivot arms 34a, 34b are in the position for receiving a radiotelephone, as illustrated in FIG. 3A. However, the pivot arm members 50a, 50b are configured such that the respective apertures 52a, 52b align coaxially when the pivot arms 34a, 34b are in the position illustrated in FIGS. 3B, 4 and 5 (i.e., when a radiotelephone 10 is secured within the cradle 30 by the pivot arms 34a, 34b).

In the illustrated embodiment, locking device 60 includes a pin 62 configured to be removably inserted through the coaxially aligned pivot arm member apertures 52a, 52b when a radiotelephone is secured within the cradle 30 by the pivot arms 34a, 34b (FIGS. 3B, 4 and 5). An actuator 64 inserts the pin 62 through the coaxially aligned apertures 52a, 52b in response to a signal (or signals) to lock the cradle pivot arms 34a, 34b. The actuator 64 removes the pin 62 from the coaxially aligned apertures 52a, 52b in response to a signal (or signals) to unlock the cradle pivot arms 34a, 34b. Preferably, the actuator 64 is an electromagnetic actuator.

It is to be understood that the present invention is not limited to the illustrated locking device and pivot arm configuration. Various pivot arm configurations may be utilized and various ways of preventing these pivot arms from releasing a radiotelephone secured thereby may be utilized. The design of a locking mechanism and cradle depends on the particular radiotelephone or other electronic device to be removably secured.

Preferably, the illustrated actuator 64 includes a signal receiver in communication therewith for receiving locking and unlocking signals. Even more preferably, a radiotelephone 10 secured within the cradle 30 and in communication with the actuator 64 and/or software code embodied within the radiotelephone serves as a signal receiver for receiving locking and unlocking signals. When a signal to lock the pivot arms 34a, 34b is received by the signal receiver, the actuator inserts the pin 62 within the coaxially aligned pivot arm member apertures 52a, 52b, as illustrated in FIG. 4. When a signal to unlock the pivot arms 34a, 34b is received by the signal receiver, the actuator withdraws the pin 62 from the coaxially aligned pivot arm member apertures 52a, 52b, as illustrated in FIG. 5, whereupon the pivot arms 34a, 34b are free to move and the radiotelephone can be removed from the cradle 30. As is known to those skilled in the art, many types of signal receivers can be utilized with the present invention, including, but not limited to, devices for receiving electric signals, audio signals, infrared signals, radio frequency signals, magnetic signals, and light signals.

A signal generator (not shown), in communication with the signal receiver generates locking and unlocking signals. Preferably, the radiotelephone 10 to be secured within the cradle 30 and/or software code embodied therewithin serves the function of a signal generator. Preferably, locking and unlocking signals are transmitted to the actuator 64 via code sequences keyed into the radiotelephone 10 via the keypad 16. Once locked within the cradle, a radiotelephone cannot be removed without keying in a particular code sequence to generate an unlocking signal.

For example, a user could key into the radiotelephone 10 a four digit code sequence, followed by the SEND key. This could cause the radiotelephone 10 to send a signal through its system connectors 24 into the cradle 30 to actuate the locking device 60 on the cradle. Alternatively, the radiotelephone 10 could transmit a locking (or unlocking) signal via its normal radio frequency (RF) circuitry. A radio signal receiver attached on or near the cradle 30 receiving the locking (or unlocking) signal could actuate the locking device 60. Preferably, when locking and unlocking signals are generated via a radiotelephone, software code internal to the radiotelephone recognizes these signals and prevents them from interfering with normal operation of the radiotelephone. Preferably, software code within the radiotelephone is provided for allowing users to select and change locking and unlocking codes.

Voice synthesis technology may be utilized in conjunction with the present invention. Audible feedback may be provided to a user indicating that the locking device 60 is engaged or disengaged. For example, when a locking code is entered into the radiotelephone, and the locking device 60 is engaged, the message "PHONE IS LOCKED INTO CRADLE" could be presented to the user audibly. Similarly, when an unlocking code is entered into the radiotelephone, and the locking device 60 is disengaged, the message "PHONE IS UNLOCKED FROM CRADLE" could be presented to the user audibly.

Additional methods of providing locking and unlocking signals to activate a locking device on the cradle may include magnetic strip readers, voice pattern recognition, finger print recognition, retinal scan recognition, and the like. Furthermore, a vehicle's ignition system and/or security system may also be utilized as signal generators for providing locking and unlocking signals. Using a vehicle's ignition system and/or security system, the unlocking of a radiotelephone from its cradle may be prohibited until the vehicle's key is in the ignition switch or until the vehicle's security system has been deactivated.

The actions initiated by activating a locking device can include additional features. For example, a radiotelephone could be programmed such that if forcibly removed from a locked cradle, the radiotelephone enters an "alarm state" that renders the radiotelephone inoperable and/or emits an audible alarm until a proper code is entered via the radiotelephone's keypad. In addition, the radiotelephone could interact with the vehicle's security system such that the vehicle's alarm is activated, or the police are called, if the radiotelephone is tampered with or removed without a proper unlocking code.

Although, primarily intended for cellular telephone applications, the present invention may be utilized with mobile radios such as police radios, cellular telephones for business applications and the like. The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for supporting an electronic device, comprising:

a cradle;

cradle securing means for removably securing said electronic device within said cradle;

signal receiving means for receiving a locking signal to lock said cradle securing means to prevent removal of said electronic device from said cradle and for receiving an unlocking signal to unlock said cradle securing means to allow removal of said electronic device from said cradle;

locking means, responsive to said signal receiving means, for locking said cradle securing means upon receipt of a locking signal and for unlocking said cradle securing means upon receipt of an unlocking signal;

electronic signal generating means in said electronic device in communication with said signal receiving means for generating locking and unlocking signals; and means for rendering said electronic device inoperable if said electronic device is removed from said cradle without said signal receiving means receiving an unlocking signal.

2. An apparatus according to claim 1 wherein said signal generating means comprises means for generating locking and unlocking signals from a vehicle security system.

3. An apparatus according to claim 1 wherein said signal generating means comprises means for generating locking and unlocking signals from a vehicle ignition system.

4. An apparatus according to claim 1 further comprising means for generating an alarm if said electronic device is removed from said cradle without said signal receiving means receiving an unlocking signal.

5. An apparatus according to claim 1 wherein said electronic device is a radiotelephone.

6. An apparatus for supporting an electronic device, comprising:

a cradle;

a pair of opposing arms pivotally connected to said cradle for removably securing said electronic device within said cradle, said pair of opposing arms configured to move in unison between a first position for receiving an electronic device within said cradle and a second position for securing said electronic device within said cradle, wherein each arm of said pair of arms has a member extending therefrom with an aperture formed therein, and wherein said members are configured such that said respective apertures align coaxially when said pair of arms are in said second position;

signal receiving means for receiving a locking signal to lock said cradle securing means to prevent removal of said electronic device from said cradle and for receiving an unlocking signal to unlock said cradle securing means to allow removal of said electronic device from said cradle; and locking means, responsive to said signal receiving means, for locking said pair of arms in said second position upon receipt of a locking signal and for unlocking said pair of arms, and thereby allowing said pair of arms to move to said first position, upon receipt of an unlocking signal, said locking means comprising:

a pin configured to be removably inserted through said coaxially aligned apertures when said pair of arms are in said second position; and an actuator for removably inserting said pin through said coaxially aligned apertures in response to said signal receiving means receiving a locking signal, and for removing said pin from said coaxially aligned apertures in response to said signal receiving means receiving an unlocking signal.

7. An apparatus according to claim 6 wherein each arm of said pair of arms has a portion configured to engage a recessed portion of said electronics device when said pair of arms are in said second position to thereby secure said electronics device within said cradle.

8. An apparatus according to claim 6 further comprising signal generating means in communication with said signal receiving means for generating locking and unlocking signals.

9. An apparatus according to claim 8 wherein said signal generating means comprises means for generating locking and unlocking signals via said electronics device.

10. An apparatus according to claim 8 wherein said signal generating means comprises means for generating locking and unlocking signals from a vehicle security system.

11. An apparatus according to claim 8 wherein said signal generating means comprises means for generating locking and unlocking signals from a vehicle ignition system.

12. An apparatus according to claim 6 further comprising means for rendering said electronics device inoperable if said electronics device is removed from said cradle without said signal receiving means receiving an unlocking signal.

13. An apparatus according to claim 6 further comprising means for generating an alarm if said electronics device is removed from said cradle without said signal receiving means receiving an unlocking signal.

14. An apparatus according to claim 6 wherein said electronics device is a radiotelephone.

15. An apparatus for supporting a radiotelephone, comprising:

a cradle;

cradle securing means for removably securing said radiotelephone within said cradle;

signal receiving means for receiving signals to lock said cradle securing means to prevent removal of said radiotelephone from said cradle and for receiving signals to unlock said cradle securing means to allow removal of said radiotelephone from said cradle;

locking means, responsive to said signal receiving means, for locking said cradle securing means upon receipt of locking signals and for unlocking said cradle securing means upon receipt of unlocking signals;

signal generating means in communication with said signal receiving means for generating locking and unlocking signals via said radiotelephone; and means for rendering said radiotelephone inoperable if said radiotelephone is removed from said cradle without said signal receiving means receiving an unlocking signal.

16. An apparatus according to claim 15 wherein said signal generating means comprises means for generating locking and unlocking signals from a vehicle security system.

17. An apparatus according to claim 15 wherein said signal generating means comprises means for generating locking and unlocking signals from a vehicle ignition system.

18. An apparatus according to claim 15 further comprising means for rendering said radiotelephone inoperable if said radiotelephone is removed from said cradle without said signal receiving means receiving an unlocking signal.

19. An apparatus according to claim 15 further comprising means for generating an alarm if said radiotelephone is removed from said cradle without said signal receiving means receiving an unlocking signal.

20. An apparatus for supporting an electronic device, comprising:

a cradle;

a pair of opposing arms pivotally connected to said cradle for removably securing said electronic device within said cradle, said pair of opposing arms configured to move in unison between a first position for receiving an electronic device within said cradle and a second position for securing said electronic device within said cradle;

signal receiving means for receiving a locking signal to lock said cradle securing means to prevent removal of said electronic device from said cradle and for receiving an unlocking signal to unlock said cradle securing means to allow removal of said electronic device from said cradle;

locking means, responsive to said signal receiving means, for locking said pair of arms in said second position upon receipt of a locking signal and for unlocking said pair of arms, and thereby allowing said pair of arms to move to said first position, upon receipt of an unlocking signal; and means for rendering said electronic device inoperable if said electronic device is removed from said cradle without said signal receiving means receiving an unlocking signal.

21. An apparatus according to claim 20 wherein each arm of said pair of arms has a member extending therefrom with an aperture formed therein, and wherein said members are configured such that said respective apertures align coaxially when said pair of arms are in said second position.

22. An apparatus according to claim 21 wherein said locking means comprises:

a pin configured to be removably inserted through said coaxially aligned apertures when said pair of arms are in said second position; and an actuator for removably inserting said pin through said coaxially aligned apertures in response to said signal receiving means receiving a locking signal, and for removing said pin from said coaxially aligned apertures in response to said signal receiving means receiving an unlocking signal.

23. An apparatus according to claim 20 wherein each arm of said pair of arms has a portion configured to engage a recessed portion of said electronic device when said pair of arms are in said second position to thereby secure said electronic device within said cradle.

24. An apparatus according to claim 20 further comprising signal generating means in communication with said signal receiving means for generating locking and unlocking signals.

25. An apparatus according to claim 24 wherein said signal generating means comprises means for generating locking and unlocking signals via said electronic device.

26. An apparatus according to claim 24 wherein said signal generating means comprises means for generating locking and unlocking signals from a vehicle security system.

27. An apparatus according to claim 24 wherein said signal generating means comprises means for generating locking and unlocking signals from a vehicle ignition system.

28. An apparatus according to claim 20 further comprising means for generating an alarm if said electronic device is removed from said cradle without said signal receiving means receiving an unlocking signal.

29. An apparatus according to claim 20 wherein said electronic device is a radiotelephone.

* * * * *